(12) United States Patent
Malthouse

(10) Patent No.: US 6,597,901 B1
(45) Date of Patent: Jul. 22, 2003

(54) DEVICE HAVING A HEADSET SOCKET

(75) Inventor: Ian Malthouse, Aldershot (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/197,867

(22) Filed: Nov. 23, 1998

(30) Foreign Application Priority Data

Nov. 28, 1997 (GB) .............................................. 9725184

(51) Int. Cl.⁷ ................................................. H04B 1/08
(52) U.S. Cl. ....................... 455/349; 455/550; 455/575
(58) Field of Search ................................. 455/349, 568, 455/569, 575, 550, 347, 348, 90; 439/329, 63, 81, 83, 668, 80, 669; 379/433, 434, 428

(56) References Cited

U.S. PATENT DOCUMENTS

| | | | | |
|---|---|---|---|---|
| 4,037,913 A | * | 7/1977 | Deitch et al. ........... 339/221 M |
| 4,392,708 A | * | 7/1983 | Bailey et al. ........... 339/182 R |
| 4,629,278 A | | 12/1986 | Norton et al. ............... 339/134 |
| 4,675,903 A | | 6/1987 | Gulezian et al. ............ 379/433 |
| 4,706,273 A | * | 11/1987 | Spear et al. .................. 379/58 |
| 4,978,310 A | * | 12/1990 | Shichida ...................... 439/188 |
| 5,035,641 A | | 7/1991 | Van-Santbrink et al. .... 439/329 |
| 5,062,024 A | | 10/1991 | Hennemann ................ 361/426 |
| 5,170,494 A | | 12/1992 | Levanto ........................ 455/90 |
| 5,189,632 A | | 2/1993 | Paajanen et al. ....... 364/705.05 |
| 5,199,896 A | * | 4/1993 | Mosquera ................... 439/329 |
| 5,214,309 A | | 5/1993 | Saarnimo ................... 257/712 |
| 5,229,701 A | | 7/1993 | Leman et al. ................... 320/2 |
| 5,253,146 A | | 10/1993 | Halttunen et al. .......... 361/784 |
| 5,256,073 A | * | 10/1993 | Reymond et al. .............. 439/79 |
| 5,265,158 A | | 11/1993 | Tattari .......................... 379/433 |
| 5,271,056 A | | 12/1993 | Pesola et al. .................. 379/58 |
| 5,310,360 A | * | 5/1994 | Peterson ...................... 439/571 |
| 5,338,215 A | * | 8/1994 | Lee et al. .................... 439/188 |
| 5,338,230 A | | 8/1994 | Bryce et al. ................. 439/629 |
| 5,361,459 A | | 11/1994 | Hyvonen et al. ............... 24/35 |
| 5,533,908 A | * | 7/1996 | Henry et al. ................. 439/329 |
| 5,557,653 A | * | 9/1996 | Paterson et al. ............... 379/58 |
| 5,603,103 A | | 2/1997 | Halttunen et al. ............. 455/90 |
| 5,642,402 A | | 6/1997 | Vilmi et al. ................... 379/58 |
| 5,669,069 A | | 9/1997 | Rautila ........................ 455/558 |
| 5,768,370 A | | 6/1998 | Maatta et al. ............... 379/433 |
| 5,779,115 A | | 7/1998 | Parkas et al. ............... 224/272 |
| 5,787,341 A | | 7/1998 | Parkas et al. .................. 455/90 |
| 5,809,115 A | | 9/1998 | Inkinen .................... 379/93.05 |
| 5,883,787 A | * | 3/1999 | Reier .......................... 361/752 |
| 6,000,970 A | * | 12/1999 | Wu .............................. 439/669 |
| 6,012,949 A | * | 1/2000 | Lok ............................. 439/570 |
| 6,089,923 A | * | 7/2000 | Phommachanh ............ 439/676 |
| 6,186,833 B1 | * | 2/2001 | Wu .............................. 439/668 |
| 6,315,620 B1 | * | 11/2001 | Moir et al. ................... 439/862 |

FOREIGN PATENT DOCUMENTS

| | | |
|---|---|---|
| EP | 0652611 A1 | 5/1995 |
| EP | 0746062 A2 | 12/1996 |
| GB | 2316550 A * | 2/1998 ........... H01R/23/70 |

* cited by examiner

*Primary Examiner*—Thanh Cong Le
*Assistant Examiner*—C. Chow
(74) *Attorney, Agent, or Firm*—Perman & Green, LLP

(57) ABSTRACT

A device such as a radiotelephone having a housing within which is located a single printed circuit board and a headset socket 30 including a body and spring contacts 38 which are held in operative contact with the circuit board by retaining means comprising co-operating parts 22, 23, 44 of the housing and the body of the socket.

23 Claims, 4 Drawing Sheets

DEVICE HAVING A HEADSET SOCKET

BACKGROUND OF THE INVENTION

The present invention relates generally to a device, and more specifically, to the way in which a headset socket is mounted within a device, such as a radiotelephone.

Devices, such as for example cellular telephones, are sometimes equipped with headsets which provide the user of the telephone with added privacy when using the telephone. The headsets include a jack or plug which is removably inserted into a socket in the telephone.

It is common practice in the art to construct a cellular telephone using two circuit boards, a first rigid circuit board bearing the main engine of the telephone and a second flexible circuit board bearing miscellaneous other components, normally including, among others, the speaker, microphone, the display and, notably, in the context of the present invention the headset socket.

The market is placing increasing demand on cellular telephone designers to reduce the physical volume of cellular telephones. One approach to physical volume reduction is to do without the second flexible circuit board.

SUMMARY OF THE INVENTION

With this in mind, the present invention provides a device having a housing within which is located a single printed circuit board and a headset socket including a body and spring contacts which are held in operative contact with the circuit board by retaining means comprising co-operating parts of the housing and the body of the socket.

By virtue of these features, the headset socket is mounted in operative contact with the single printed circuit board in a way which is reliable despite the direct forces to which it is subjected by the user during insertion and removal of the plug.

BRIEF DESCRIPTION OF THE DRAWINGS

Exemplary embodiments of the invention are hereinafter described with reference to the accompanying drawings, in which.

DETAILED DESCRIPTION OF THE INVENTION

Figure 1:
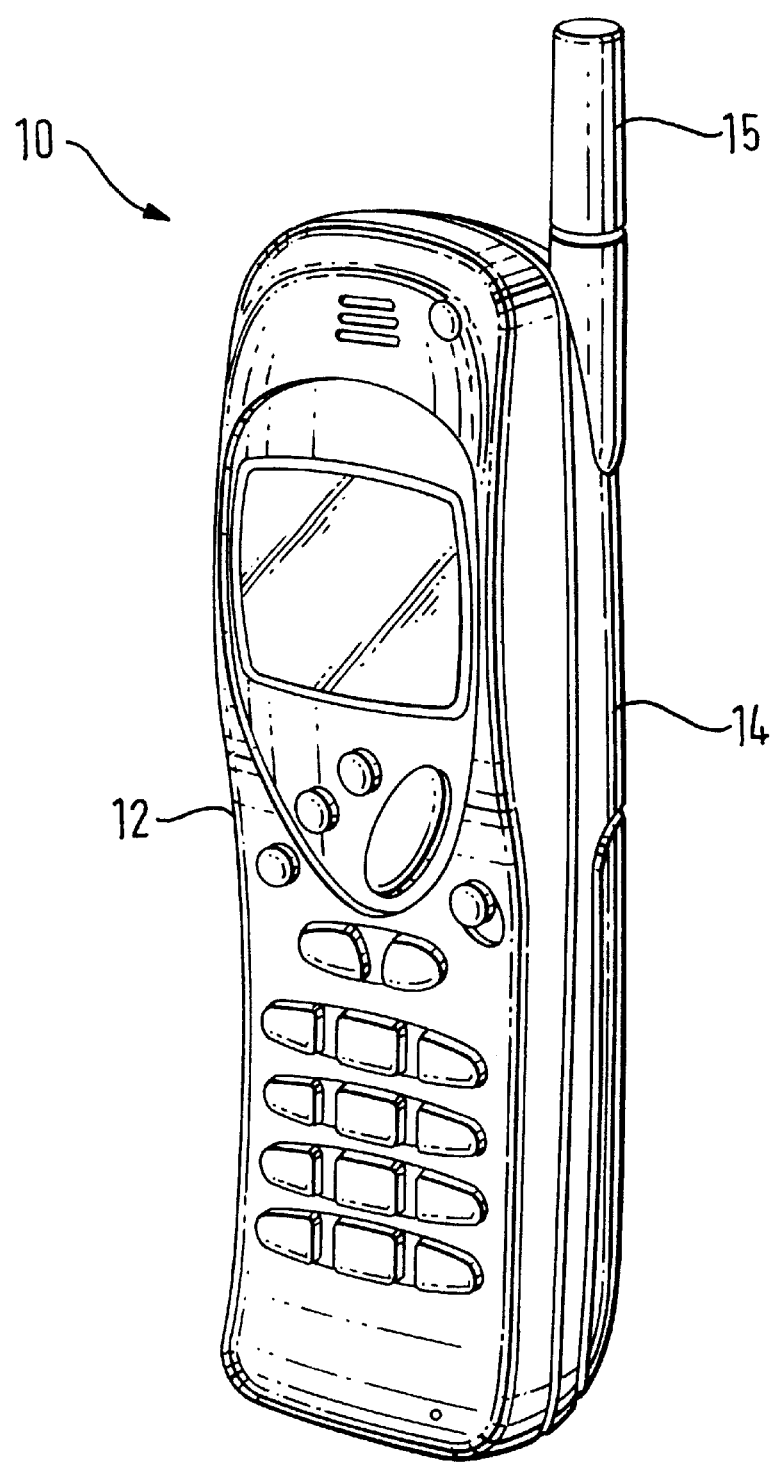
FIG. 1 shows a perspective view of a cellular telephone in accordance with the present invention.

A cellular telephone in accordance with the invention is shown in FIG. 1 and is generally designated 10. The telephone 10 comprises a housing having a front casing 12 and a rear casing 14. An antenna 15 projects from the top of the rear casing 14. Within the housing, a single (rigid) printed circuit board 16 is provided. The main engine of the telephone is surface mounted to the circuit board and other ancillary electrical/electronic components are directly connected to it.

Figure 2:
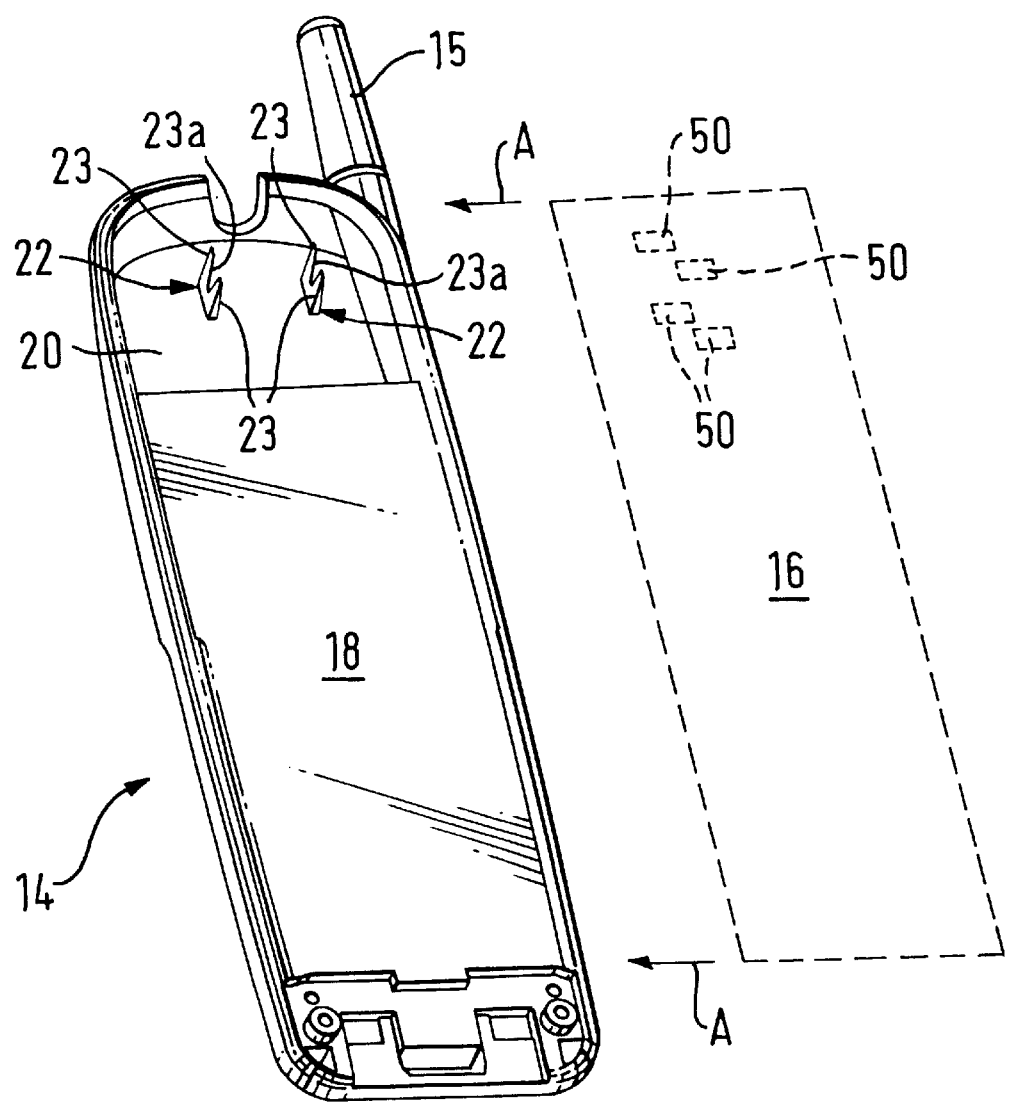
FIG. 2 shows a perspective schematic view of the rear casing of the telephone of FIG. 1.

FIG. 2 shows the rear casing 14 of the telephone 10. In this drawing, the front casing 12 of the telephone 10 has been completely omitted and an outline of the circuit board 16 is shown in dashed lines displaced from its normal position within the rear casing 14. The inside of the rear casing 14 may be thought of as being divided into a large first region 18 making up most of the internal area of the casing 14 and a small second region 20 in the vicinity of the antenna 15. Inside the second region 20, a pair of spaced rests 22 are provided. Each rest 22 comprises a pair of upstanding fingers 23 defining a generally U-shaped space or recess 23a therebetween. The general depth within the rear casing 14 of the first and second regions 18, 20 differs to an extent that if the circuit board 16 is placed in position, as indicated by arrows A, it rests on the large region 20 and covers the second region 18 while leaving a small clearance between the free ends of the fingers 23 and the lower surface of the circuit board 16.

Figure 3:
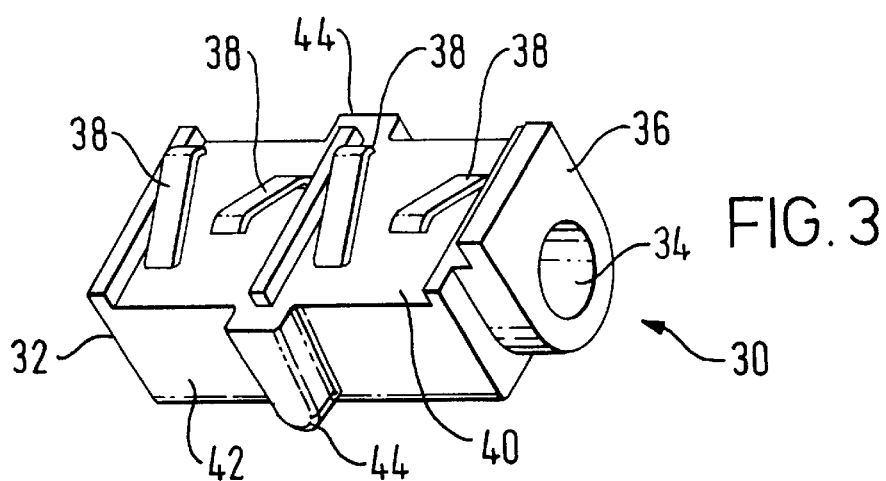
FIG. 3 shows a perspective view of the headset socket used in the telephone of FIG. 1.
Figure 4:
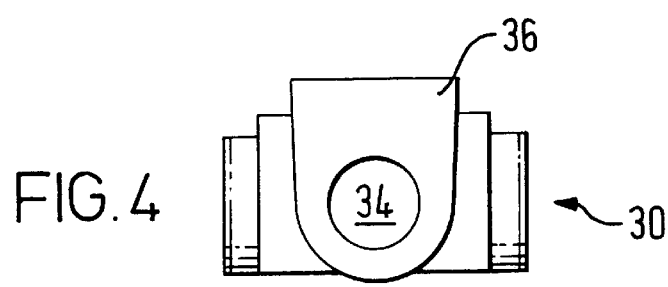
FIG. 4 shows an end view of the headset socket of FIG. 3.
Figure 5:
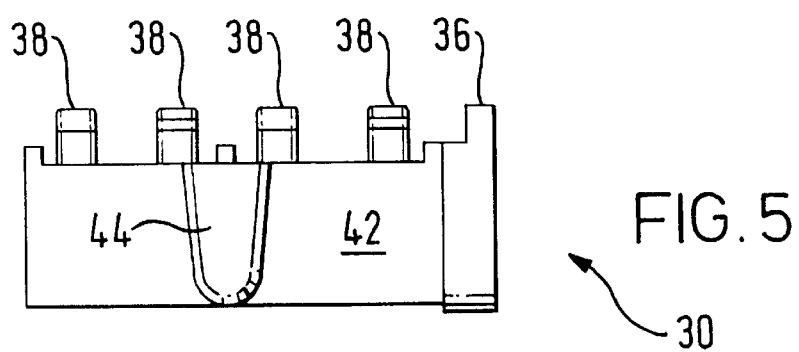
FIG. 5 shows a side view of the headset socket of FIG. 3.
Figure 6:
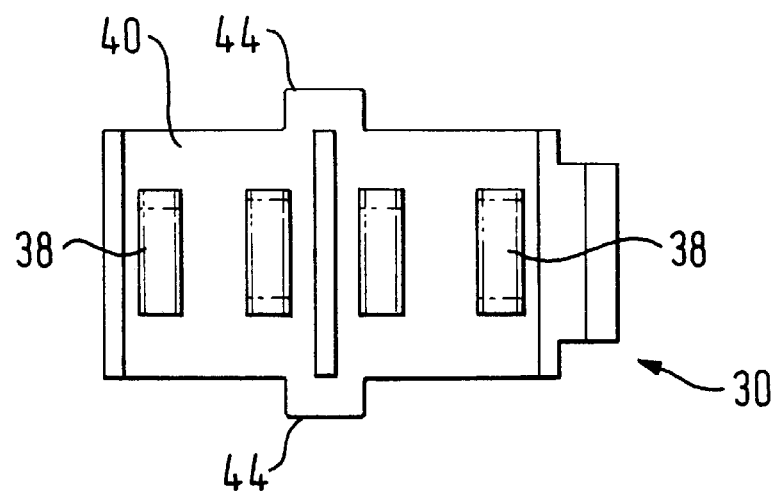
FIG. 6 shows a plan view of the headset socket of FIG. 3.
Figure 7:
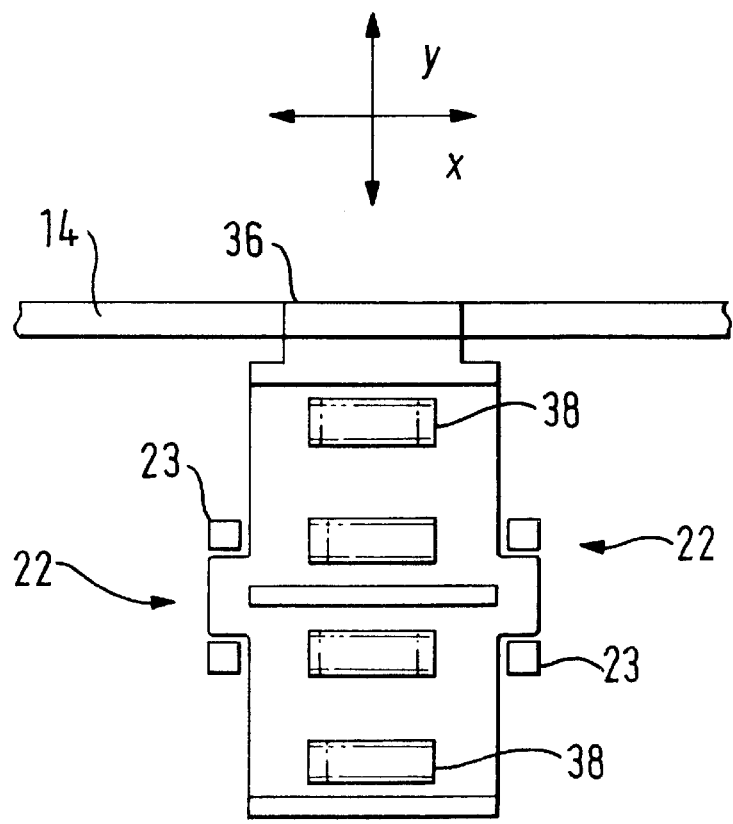
FIG. 7 shows a plan view of the headset socket mounting in the rear casing of the telephone.

The rests 22 are intended to retain in position a headset socket 30. The socket 30 is shown from various views in FIGS. 3 to 6. Referring to FIG. 3, the socket 30 comprises a body 32 generally having the shape of a rectangular block. The body 32 includes an aperture 34 formed in its front face 36 for receiving the plug of a headset. The coupling of the headset plug within the socket 30 is conventional and so is not described here further, except to say that this coupling is communicated electrically from the socket 30 to the rest of the telephone by spring fingers 38. The spring fingers 38 upstand at an acute angle from the upper surface 40 of the body 32. In FIGS. 3 and 5, the spring fingers 38 are shown in their natural bias position. The spring fingers 38 can be depressed to lie flat against the upper surface 40 of the body 30. On opposed side surfaces 42 of the body 32, a pair of retaining protuberances or wings 44 are formed. The retaining wings 44, as best seen in FIG. 5, are generally U-shaped and adapted to sit within the U-shaped spaces 23a defined by each rest 22. FIG. 7 shows the socket 30 in this position. It will be noted from this drawing that the front face 36 of the body 30 stands flush with the outer surface of the casing 14.

During assembly, the socket 30 is placed into position by a pick-and-place machine. With this in mind, the dimensional tolerances of the retaining wings 44 and the rests 22 are selected to be compatible with the alignment accuracy of this process. Then, the circuit board 16 is fitted within the rear casing 14 as illustrated by arrows A in FIG. 2. Contact pads 50 on the underside (from the FIG. 2 viewpoint) of the circuit board 16 as shown in dotted outline in FIG. 2 each press against one of the spring fingers 38 to provide the electrical connection of the socket 30 with the circuit board 16.

Referring to FIG. 7, it will be appreciated that during insertion and removal of the plug, the socket 30 is subjected to forces in the y-direction. The socket 30 is substantially prevented from moving in this axis in both directions by virtue of the retaining wings 44 being confined between the fingers 23 of the rests 22. In this way, the engagement of the retaining wings 44 and the rests 22 bears the forces applied by the user and so these forces need not be borne by means for maintaining electrical contact with the circuit board. It will be noted from FIG. 7 the body 32 of the socket being lodged between the rests 22 is confined in the x-direction too. Because of the above-mentioned dimensional tolerances between the retaining wings 44 and the rests 22, there can be some play between these co-operating parts. However, because the fingers 38 are sprung and not fixed or joined, for example by solder, to the circuit board, the integrity/reliability of the electrical connection between the fingers 38 and the pads 50 is not impaired.

In the above described embodiment, the rear casing and the socket fit together with the socket supplying the male parts, i.e. the retaining wings 44, and the rear casing supplying the female parts, i.e. the rests 22 within which the retaining wings are held. In other embodiments, the socket may be provided with female parts and the rear casing may be provided with male parts.

The invention has been described with specific reference to a radio telephone. However it will be apparent to the reader that the headset socket arrangement described is applicable to any device incorporating a headset socket.

What is claimed is:

1. A device having a housing within which is located a single printed circuit board and a headset socket including a body and spring contacts which are held in operative contact with surface contact pads of the circuit board by retaining means comprising cooperating parts of the housing and the body of the socket, including at least one male part on one of the housing or the body of the headset and complementary female parts on the other of the housing or body.

2. A device as in claim 1, wherein the retaining means serves to restrict movement in orthogonal axes in said plane.

3. A device as in claim 1, wherein the retaining means allows movement in an axis orthogonal to said plane.

4. A device as in claim 1, wherein the retaining means serves to restrict movement of the socket in a plane parallel to that of the circuit board.

5. A device according to claim 1 wherein the device is a radiotelephone.

6. A headset socket suitable for the device according to claim 1.

7. A headset socket comprising a body and spring contacts having a housing within which is located a single printed circuit board and a headset socket including a body and spring contacts which are held in operative contact with surface contact pads of the circuit board by retaining means comprising cooperating parts of the housing and the body of the socket, including at least one male part on one of the housing or the body of the headset and complementary female parts on the other of the housing or body, the retaining means comprising first retaining means adapted to cooperate with corresponding second retaining means on a device in which the headset socket is to be mounted, the first retaining means being arranged to hold the body with the second retaining means and the spring contacts in operative contact with electrical surface contact pads of the device.

8. A headset socket according to claim 7, wherein the retaining means serves to restrict movement of the socket in a plane parallel to that of the circuit board.

9. A headset socket according to claim 7, wherein the retaining means allows movement in an axis orthogonal to said plane.

10. A device having a housing within which is located a single printed circuit board and a headset socket including a body and spring contacts which are held in operative contact with surface contact pads of the circuit board by retaining means comprising cooperating parts of the housing and the body of the socket wherein the retaining means comprise the body of the socket and the parts of the housing having mating rests with recesses and retaining protuberances which extend into the recesses.

11. A device as in claim 10 wherein the body of the socket comprises a plug receiving aperture with a center axis generally transverse to a direction of deflection of the spring contacts when the spring contacts are contacted by the surface contact pads.

12. A device as in claim 1 wherein the body of the socket is removably connected to the housing.

13. A device as in claim 1 wherein the spring contacts are removably connected to the surface contact pads.

14. A socket as in claim 7 wherein the first retaining means comprises the body of the socket having retaining protuberances adapted to extend into recesses of the second retaining means.

15. A socket as in claim 14 wherein the body of the socket comprises a plug receiving aperture with a center axis generally transverse to a direction of deflection of the spring contacts when the spring contacts are contacted by the surface contact pads.

16. A socket as in claim 7 wherein first retaining means comprises the body of the socket being sized and shape to be removably connected to the second retaining means.

17. A socket as in claim 7 wherein the spring contacts are adapted to be removably connected to the surface contact pads.

18. An electronic device comprising:

a housing;

a printed circuit board connected to the housing; and a headset socket connected to the housing and directly electrically connected to the printed circuit board, wherein the headset socket comprises spring contacts making direct surface mount contact on surface contact pads of the printed circuit board.

19. A device as in claim 18 wherein the socket comprises a body with a plug receiving aperture having a center axis generally parallel to a main plane of the printed circuit board, and wherein the spring contacts deflect generally perpendicular to the main plane when the socket and printed circuit board are placed against each other.

20. An electronic device comprising:

a housing;

a printed circuit board connected to the housing; and a headset socket connected to the housing and directly electrically connected to the printed circuit board, wherein the headset socket comprises a body and spring contacts which are held in operative contact with surface contact pads of the circuit board by retaining means comprising cooperating parts of the housing and the body of the socket, including at least one male part on one of the housing or the body of the headset and complementary female parts on the other of the housing or body.

21. A device as in claim 18 wherein the socket comprises a body connected to the housing by a mechanical connection which substantially prevents movement of the body relative to the housing in two orthogonal axes, and allows movement in only one direction in a third orthogonal axis.

22. A device as in claim 21 wherein the body of the socket comprises a plug receiving aperture with a center axis along one of the two orthogonal axis.

23. A method of assembling an electronic device comprising steps of:

positioning a headset socket in a first direction into a receiving mount of a housing piece of the device, the headset socket including a body and spring contacts which are held in operative contact with surface contact pads of the circuit board by retaining means comprising cooperating parts of the housing and the body of the socket, including at least one male part on one of the housing or the body of the headset and complementary female parts on the other of the housing or body the receiving mount being adapted to restrain movement of a body of the socket in two orthogonal axes which are generally transverse to the first direction; and placing a printed circuit board against the headset socket, wherein spring contacts of the headset socket make a removable surface mount contact with surface contact pads of the printed circuit board.

* * * * *